United States Patent
Bar-Erez et al.

(10) Patent No.: US 7,749,347 B2
(45) Date of Patent: Jul. 6, 2010

(54) METHOD AND APPARATUS FOR ADHERING SHEETS TOGETHER WITHOUT TRAPPED BUBBLES AND EASY DETACHMENT OF STACK

(75) Inventors: Yosi Bar-Erez, Sirkin (IL); Exal Bar-Erez, Sirkin (IL)

(73) Assignee: Solido 3D Ltb, Rosh Haayin (IL)

( * ) Notice: Subject to any disclaimer, the term of this patent is extended or adjusted under 35 U.S.C. 154(b) by 1179 days.

(21) Appl. No.: 10/471,320

(22) PCT Filed: Mar. 11, 2002

(86) PCT No.: PCT/IL02/00193

§ 371 (c)(1),
(2), (4) Date: Sep. 10, 2003

(87) PCT Pub. No.: WO02/072352

PCT Pub. Date: Sep. 19, 2002

(65) Prior Publication Data

US 2004/0089417 A1    May 13, 2004

Related U.S. Application Data

(60) Provisional application No. 60/274,637, filed on Mar. 12, 2001.

(51) Int. Cl.
    *B32B 37/10*    (2006.01)

(52) U.S. Cl. ............................ 156/87; 156/291; 156/295
(58) Field of Classification Search ................ 156/546, 156/547, 550, 87, 291, 295, 71; 427/428.01; 493/331, 334, 336, 337
See application file for complete search history.

(56) References Cited

U.S. PATENT DOCUMENTS

| 3,819,448 | A | * | 6/1974 | Beever, III | 156/355 |
| 4,115,178 | A | * | 9/1978 | Cone et al. | 156/291 |
| 4,493,743 | A | * | 1/1985 | Lunding | 156/555 |
| 5,942,062 | A | * | 8/1999 | Hassall et al. | 156/87 |
| 5,985,084 | A | * | 11/1999 | Summersgill et al. | 156/273.7 |
| 6,575,218 | B1 | * | 6/2003 | Burns et al. | 156/512 |

FOREIGN PATENT DOCUMENTS

| WO | WO 99/34976 | * | 7/1999 |
| WO | WO99/43490 | | 9/1999 |

* cited by examiner

*Primary Examiner*—Richard Crispino
*Assistant Examiner*—Christopher Schatz
(74) *Attorney, Agent, or Firm*—Mark M. Friedman

(57) ABSTRACT

Disclosed is a method and apparatus for bonding sheets together without trapping bubbles between two adjacent sheets and a procedure for easy detachment of the completed stack of bonded together sheets from the apparatus that constructed it. The present invention is particularly well suited for use with apparatus for construction of three-dimensional objects from a stack of thin sheets bonded together.

14 Claims, 7 Drawing Sheets

METHOD AND APPARATUS FOR ADHERING SHEETS TOGETHER WITHOUT TRAPPED BUBBLES AND EASY DETACHMENT OF STACK

This is the U.S. national phase of International Application No. PCT/IL02/00193, filed Mar. 11, 2002, which claims priority from Provisional Application No. 60/274,637, filed Mar. 12, 2001.

FIELD AND BACKGROUND OF THE INVENTION

The present invention relates to making three-dimensional objects, such as models, dies, molds and the like by bonding together a large number of relatively thin layers, each containing the contour of a thin slice of the object and, in particular, it concerns a method and apparatus for bonding the sheets together without trapping bubbles between two adjacent sheets and a procedure for easy detachment of the stack of bonded together sheets upon completion of the three-dimensional object. In practical usage, the terms adhere, bond, glue and their respective grammatical derivations are considered to be synonymous, and may therefore be used interchangeably herein.

The entrapment of air-bubbles between two planar surfaces when they are bonded together is a well-known phenomenon that may cause non-uniform bonding of the layers, thus weakening the bond.

Application specific solutions have been suggested. WO9943490 to Oehman, for example, discloses a method for gluing optical disc substrates together, by holding the substrates coaxially in a horizontal attitude, introducing liquid adhesive to a central region of the gap between them and rotating the discs rapidly while bringing them together.

The problem of bonding without air bubbles is exacerbated when sequentially adhering sheets together due to lack of planarity in different regions of the top surface of the stack. This lack of planarity is due to varied thickness of the stack in different regions, caused by sheet manufacturing production tolerances, or uneven spreading of adhesive between the sheets.

Attempts to solve the problem of trapped air bubbles when building a three-dimensional object on a planar surface consider the seemingly contradictory requirements of providing a stable structure for the accumulated layer-by-layer construction while enabling easy removal of the bonded stack containing the three-dimensional object from the stable structure once it is complete.

There is therefore a need for a method and device for adhering subsequent sheets to a stack without trapped bubbles while providing a mode for the easy removal of the finished stack from the mechanism that created the stack.

SUMMARY OF THE INVENTION

The present invention is a method and apparatus for bonding sheets together without trapping bubbles between two adjacent sheets and a procedure for easy detachment of the completed stack of bonded together sheets from the apparatus that constructed it.

According to the teachings of the present invention there is provided, a method of adhering sheets together without entrapping bubbles between the sheets, comprising: providing a stack of at least one sheet, the stack including a stack top, a leading stack edge, and a terminal stack edge; positioning at least a first flexible unbonded sheet proximal to the stack, the unbonded sheet including a sheet top side, a sheet underside, a leading sheet edge and a terminal sheet edge; dispensing adhesive on one of the underside of the unbonded sheet and the stack top; and deploying the unbonded sheet on the stack top, by use of an application mechanism, by: bringing the underside of the unbonded sheet adjacent to the leading sheet edge into contact with the stack top adjacent to the leading stack edge thereby creating a bonded portion of the unbonded sheet, a remaining unbonded portion of the unbonded sheet is supported above the stack top thereby defining a line of contact between the unbonded sheet and the stack top; and moving an application mechanism across the stack top in a direction that is substantially parallel to the stack top, and substantially perpendicular to and away from the leading stack edge, the unbonded sheet being deployed between a sheet contact surface of the application mechanism and the stack top, the movement thereby advancing the line of contact in the direction of movement.

According to a further teaching of the present invention, the dispensing of the adhesive is in an amount sufficient to create an accumulation of the adhesive in a region adjacent to the line of contact, the region being on an as of yet unbonded side of the line of contact, the accumulation moving concurrently with the line of contact.

According to a further teaching of the present invention, the dispensing of the adhesive is accomplished by moving an adhesive dispenser over the stack top.

According to a further teaching of the present invention, the dispensing of the adhesive is accomplished by supporting the adhesive dispenser a distance away from a surface to which the adhesive is applied.

According to a further teaching of the present invention, the dispensing of the adhesive is accomplished by the adhesive dispenser contacting a surface to which the adhesive is applied.

According to a further teaching of the present invention, the moving of the adhesive dispenser and the moving of the application mechanism is concurrent in the direction of movement, the adhesive dispenser being deployed forward of the line of contact and the application mechanism being deployed rearward of the line of contact.

According to a further teaching of the present invention, the dispensing of the adhesive is substantially continuous.

According to a further teaching of the present invention, the dispensing of the adhesive is substantially at intervals.

According to a further teaching of the present invention, the moving of the application mechanism includes applying pressure to the unbonded sheet and the stack top.

According to a further feature, the present invention is configured to bend the unbonded sheet such that the remaining portion of the unbonded sheet is at angle to the stack top at a degree sufficient enough that properties of resiliency inherent to the unbonded sheet create forces whereby the unbonded sheet is pressed against the stack top.

According to a further feature, the present invention is configured to vary the vertical distance between the sheet contact surface and the stack top, the variance calculated according to a required amount of the adhesive.

According to a further teaching of the present invention, the deploying of the unbonded sheet on the stack top is accomplished by use of the application mechanism including the sheet contact surface implemented as a cylindrical surface of a roller.

According to a further teaching of the present invention, the deploying of the unbonded sheet on the stack top is accomplished by use of the application mechanism which includes the sheet contact surface implemented as a linear region of contact of a non-rotating bar.

According to a further teaching of the present invention, the deploying of the unbonded sheet on the stack top is accomplished by use of the application mechanism which includes the sheet contact surface implemented as a substantially planar surface of a non-rotating plate.

According to a further teaching of the present invention, the advancement of the line of contact continues to the terminal sheet edge.

According to a further feature, the present invention is configured to vary the lengths of subsequent ones of the unbonded sheet in the direction of movement such that subsequent terminal sheet edges form a stepped configuration.

There is also provided according to the teachings of the present invention, a mechanism for adhering sheets together without entrapping bubbles between the sheets, comprising: a framework; a base, deployed on the framework, upon which a successive stack of sheets is constructed, the base, and subsequently the stack, including a stack top, a leading stack edge, and a terminal stack edge; a guide mechanism deployed on the framework so as to support at least a first flexible unbonded sheet proximal to the stack top, the unbonded sheet including a sheet top side, a sheet underside, a leading sheet edge and a terminal sheet edge; an adhesive dispenser movably attached to the framework so as to deposit adhesive on one of the underside of the unbonded sheet and the stack top; and an application mechanism movably attached to the framework so as to bond the unbonded sheet on the stack top, by: bringing the underside of the unbonded sheet adjacent to the leading sheet edge into contact with the stack top adjacent to the leading stack edge thereby creating a bonded portion of the unbonded sheet, a remaining unbonded portion of the unbonded sheet is supported above the stack top thereby defining a line of contact between the unbonded sheet and the stack top; and moving an application mechanism across the stack top in a direction that is substantially parallel to the stack top, and substantially perpendicular to and away from the leading stack edge, the unbonded sheet being deployed between a sheet contact surface of the application mechanism and the stack top, the movement thereby advancing the line of contact in the direction of movement.

According to a further teaching of the present invention, the adhesive dispenser deposits an amount of the adhesive sufficient to create an accumulation of the adhesive in a region adjacent to the line of contact, the region being on an as of yet unbonded side of the line of contact, the accumulation moving concurrently with the line of contact.

According to a further teaching of the present invention, the framework includes an apparatus for constructing three-dimensional objects from thin layers of sheet material that are bonded together.

According to a further teaching of the present invention, the adhesive dispenser and the application mechanism move concurrently in the direction of movement, the adhesive dispenser being deployed forward of the line of contact and the application mechanism being deployed rearward of the line of contact.

According to a further teaching of the present invention, the adhesive dispenser is supported a distance above a surface to which the adhesive is applied.

According to a further teaching of the present invention, the adhesive dispenser contacts a surface to which the adhesive is applied.

According to a further teaching of the present invention, the adhesive is dispensed continuously.

According to a further teaching of the present invention, the adhesive is dispensed at intervals.

According to a further teaching of the present invention, the application mechanism applies pressure to the unbonded sheet and the stack top.

According to a further teaching of the present invention, the guide mechanism supports the unbonded sheet such that the remaining portion of the unbonded sheet is at angle to the stack top at a degree sufficient enough that properties of resiliency inherent to the unbonded sheet create forces whereby the unbonded sheet is pressed against the stack top.

According to a further teaching of the present invention, a vertical distance between the sheet contact surface and the stack top is varied, the variance calculated according to a required amount of the adhesive.

According to a further teaching of the present invention, the sheet contact surface is implemented as a cylindrical surface of a roller.

According to a further teaching of the present invention, the sheet contact surface is implemented as a linear region of contact of a non-rotating bar.

According to a further teaching of the present invention, the sheet contact surface is implemented as a substantially planar surface of a non-rotating plate.

According to a further teaching of the present invention, the line of contact is advanced substantially to the terminal sheet edge.

According to a further teaching of the present invention, subsequent ones of the unbonded sheet are of varied lengths in the direction of movement such that subsequent terminal sheet edges form a stepped configuration.

There is also provided according to the teachings of the present invention, a method for facilitating removal of a stack of bonded together sheets from a rigid support base, the method comprising: attaching a flexible support structure to the rigid support base; constructing the stack of bonded sheets such that a bottom surface of the stack is interconnected with a top surface of the flexible support structure; removing the flexible support structure from the rigid support base; and separating the flexible support structure from the bottom surface of the stack.

According to a further teaching of the present invention, the attaching the flexible support structure to the rigid support base is accomplished by use of adhesive material.

According to a further teaching of the present invention, the attaching the flexible support structure to the rigid support base is accomplished by use of a plurality of connection posts extending from the rigid support base, the connection post being inserted into perforations in the flexible support structure, the perforations being of a size so as to grip the connection posts, the perforations being located such that the flexible support structure is substantially planar when so connected to the rigid support base.

There is also provided according to the teachings of the present invention, a mechanism for facilitating removal of a stack of bonded together sheets from an apparatus for bonding sheets together into a stack, the apparatus comprising: a rigid support base connected to the apparatus, the rigid support base having a stack construction surface; and a flexible support structure detachably engagable with the rigid support base on the stack construction surface, the flexible support structure having a stack adhesion surface.

According to a further teaching of the present invention, the flexible support structure is configured from one of a list including natural rubber, silicon rubber and plastic such as polypropylene.

According to a further teaching of the present invention, the rigid support base and the flexible support structure are configured such that the flexible support structure is engagable with the rigid support base by use of adhesive material, and detachable by use of an appropriate adhesive releasing agent.

According to a further teaching of the present invention, the rigid support base is configured with a plurality of connection posts extending from the stack construction surface and the flexible support structure is configured with at least a like number of corresponding perforations such that the flexible support structure is engagable with the rigid support base by inserting the connection posts into the corresponding perforations such that the stack adhesion surface is substantially planar and substantially parallel to the construction surface.

According to a further teaching of the present invention, the rigid support base is connected to an apparatus for constructing a three-dimensional object from thin layers of sheet material that are bonded together.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method and apparatus for bonding sheets together without trapping bubbles between two adjacent sheets and a procedure for easy detachment of the completed stack of bonded together sheets from the apparatus that constructed it.

The principles and operation of bonding sheets together without trapping bubbles between two adjacent sheets and a procedure for easy detachment of the completed stack of bonded together sheets according to the present invention may be better understood with reference to the drawings and the accompanying description.

Figure 11:
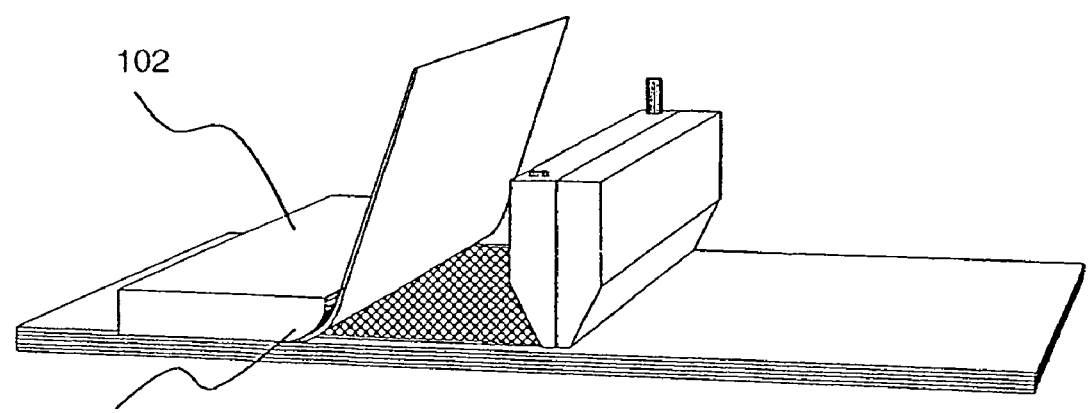
FIG. 11 is a schematic perspective view of a third preferred embodiment of a sheet bonding mechanism constructed and operative according to the teachings of the present invention, wherein the adhesive is deposited on the top of the bonded together sheets, and the application mechanism is a planar element with an up curved leading edge.
Figure 12:
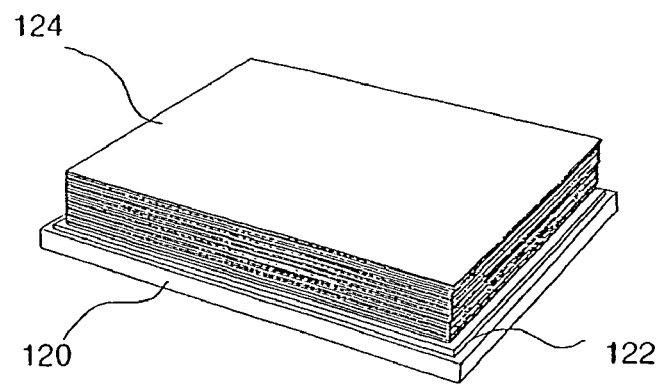
FIGS. 12-14 are a series of schematic perspective views of a preferred embodiment of a mechanism for the easy release of a stack of bonded together sheets from the apparatus that bonded the sheets together constructed and operative according to the teachings of the present invention, and a preferred method for the use of the mechanism.
Figure 13:
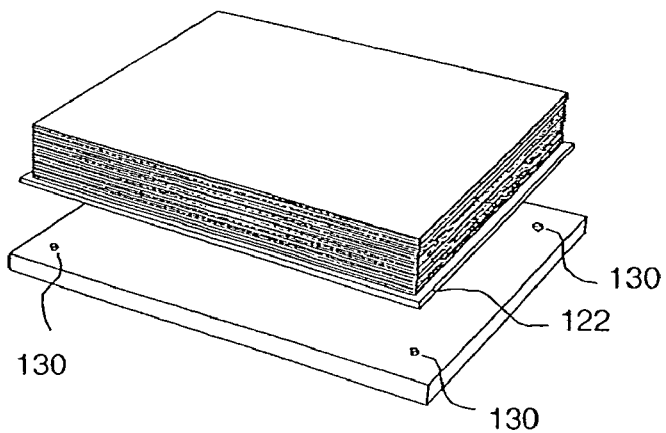
Figure 14:
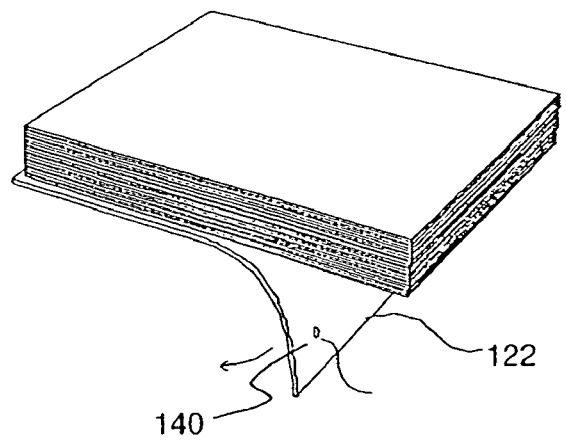

Before turning to details of the present invention, it should be appreciated that the present invention provides two sets of features, each of which may be used alone, however, when combined they provide a particularly useful and versatile procedure for constructing a stack of bonded together sheets without bubbles trapped between layers (FIGS. 1-11), and easily removing the completed stack from the bonding apparatus (FIGS. 12-14). It will be appreciated that while the features of the present invention are applicable to any apparatus for bonding subsequent sheets together to form a stack, they are particularly well suited for use with apparatus used for the construction of three-dimensional object from thin layers of bonded together sheet material, for example as described in published patent application WO9934976, incorporated herein by reference. It should be noted that while some embodiments of the present invention may be discussed with relation to the apparatus of WO9934976, structural elements of that apparatus are not shown in the accompanying figures so as to not obscure the elements of the present invention. Other non-limiting applications include cloth-plastic welding, plastic-plastic welding and others, and in the printing industry, wood industry, glue applicators and others.

Figure 1:
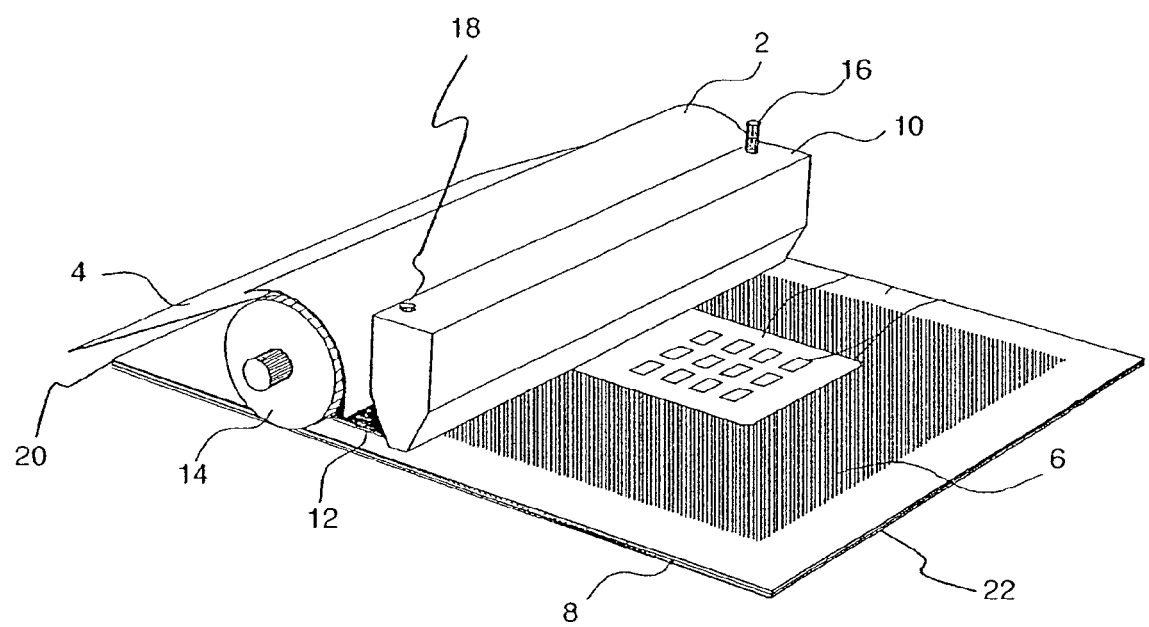
FIG. 1 is a schematic perspective view of a first preferred embodiment of a sheet bonding mechanism constructed and operative according to the teachings of the present invention, wherein the adhesive is deposited on the top of the bonded together sheets, and the application mechanism is a roller.

Referring now to the drawings relating to the feature of constructing a stack of bonded together sheets without bubbles trapped between layers, the view of FIG. 1 shows the structural elements of a first preferred embodiment of the present invention. The guide mechanism 2 directs the unbonded sheet 4 into position for bonding to the top 6 of the stack 8 of bonded together sheets. The adhesive dispenser 10 deposits adhesive 12 in front of the unbonded sheet as the unbonded sheet is attached to the stack top 6 by the application mechanism 14 as the application mechanism and the adhesive dispenser move across the stack top 6, moving from the leading edge 20 of the stack to the terminal edge 22.

The adhesive dispenser 10 may be configured with an inlet tube 16 so as to be supplied with adhesive from an external source. Alternatively, the adhesive dispenser may contain the entire amount of adhesive required. The operation elements of the adhesive dispenser are not shown. These elements may include, but are not limited to, configuration for gravity driven dispensing of the adhesive with an inner tunnel for adhesive flow and a slit, or a series of small holes in its bottom side, used as the adhesive outlet, and have a series of nozzles in its bottom side for spraying or dripping the adhesive. Other non-limiting devices known in the art that may be suitably adapted for use with the present invention are solenoid valves, actuators, inkjet sprays, piezoelectric devices, and pressure sprayers. The adhesive dispenser 10 may also have an automatic or manual air outlet 18, which may also serve as a pressure equalization outlet.

Figure 2:
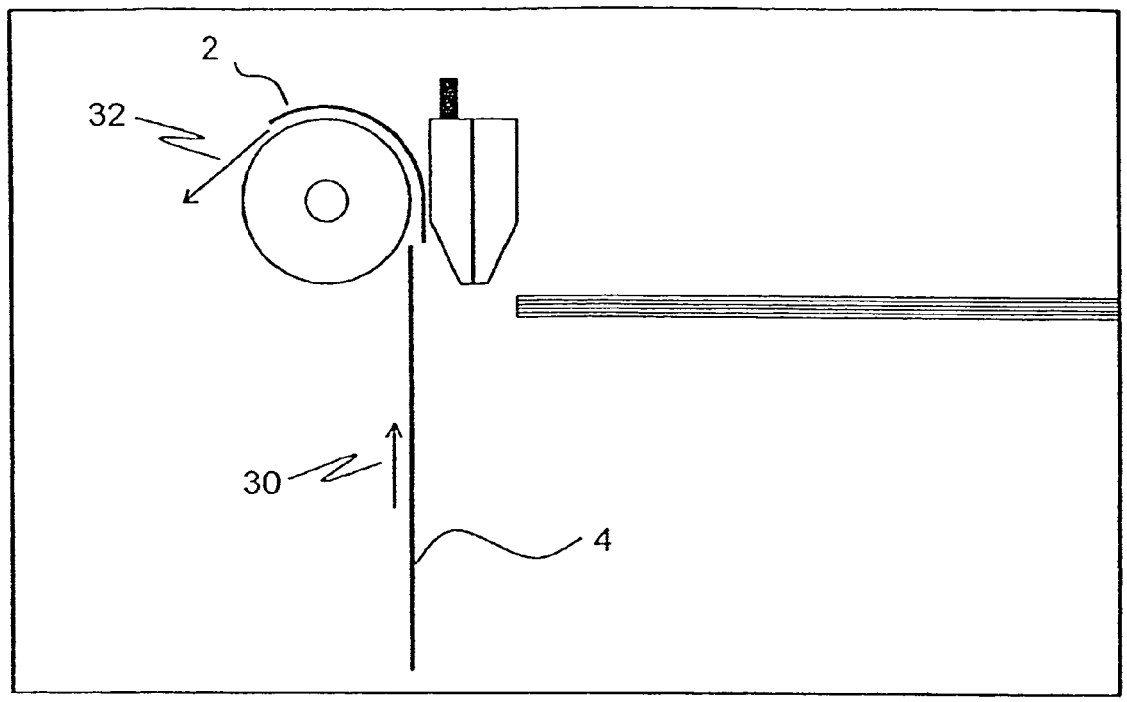
FIGS. 2-4 are a series of side elevation schematic views of a preferred method of bonding sheets together according to the teachings of the present invention, as implemented by the preferred embodiment of FIG. 1.
Figure 3:
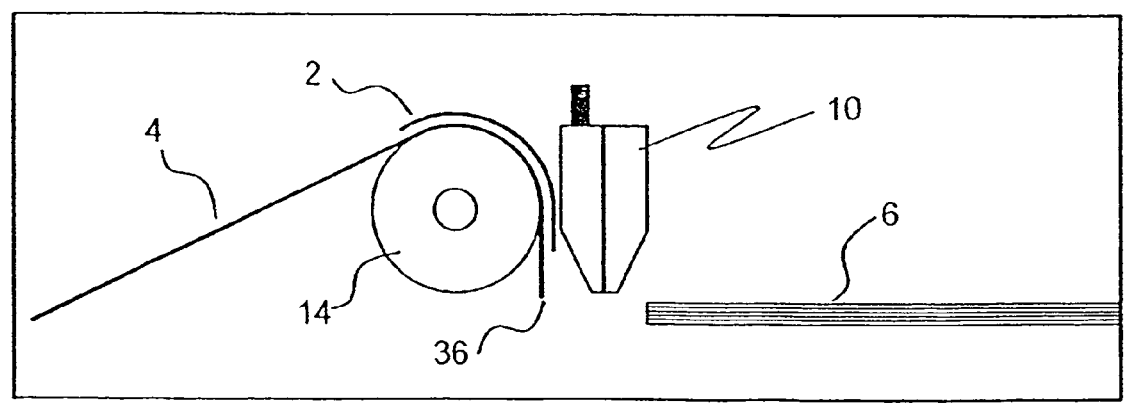
Figure 4:
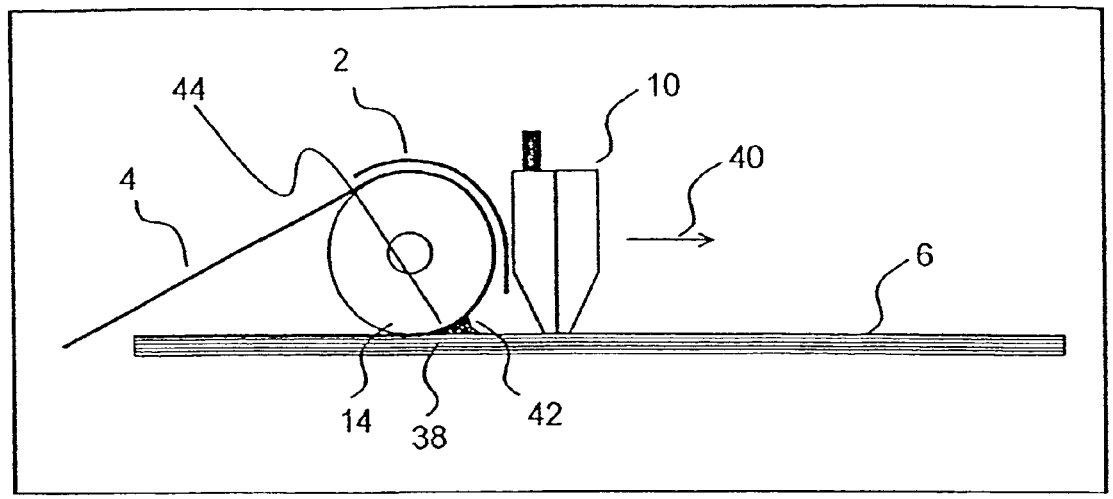

Turning now to the process of bonding the sheets to each other, as illustrated in FIGS. 2-4, an unbonded sheet 4 moves in the direction indicated by arrow 30, from a stored position (not shown) to the guiding mechanism. The guiding mechanism 2 diverts the movement of the unbonded sheet to the direction indicated by arrow 32 where it is supported by a support element (not shown). This bottom-loading configuration is valuable for providing a compact structure in which sheets are stored under the table of the apparatus. Alternatively, the sheets may be stored lower than, but not under, the table or the unbonded sheet 4 may be loaded from a different direction, depending on the configuration of the sheet bonding apparatus.

FIG. 3 shows the unbonded sheet 4 in a loaded position, opposite its final position after the adhering process on the top of the stack of bonded together sheets. As shown here, the guiding mechanism 2, the application mechanism 14, and the adhesive dispenser 10 are included in a movable adhering unit. As the adhering mechanism moves across the stack top 6 in the direction indicated by arrow 40 (FIG. 4), the adhesive dispenser 10 deposits adhesive on the region of the stack top proximal to and in front of the unbonded sheet 4. As the leading sheet edge 36 of the unbonded sheet contacts the stack top, that region of the unbonded sheet adheres to the stack top and defines a line of contact 38 between the unbonded sheet and the stack top. The application mechanism 14, together with the guiding mechanism 2 cause a "curl" to be formed in the unbonded sheet, in proximity to the stack top. Alternatively, a bend may be formed, as will be discussed in regard to FIG. 11.

The movement of the application mechanism 14 across the stack top, as seen in FIG. 4, causes an accumulation of adhesive 42 to form between the unbonded sheet 4 and the stack top 6, adjacent to the line of contact in the as of yet unbonded region. The accumulation of adhesive 42 pushes substantially all air away from the region directly adjacent to the line of contact 38, allowing the unbonded sheet to be adhered to the stack top without air-bubbles entrapped in between. To assure a proper accumulation of adhesive, the adhesive dispenser deposits a larger amount of adhesive at the beginning of its movement, than during the remainder of the movement. The parameters of the accumulation of adhesive are dependent on the adhesive being used.

The problems that may arise from excess adhesive being accumulated or spilled at the far end of the stack are potentially serious enough to be addressed. These problems may include, wetting the sheet contact surface of the application mechanism and causing the end of the stack to swell. If the height of this swelling were to become sufficient, it may interrupt the movement of the adhering unit. To avoid spilling excess adhesive at the terminal edge of the stack top, when a predefined amount of adhesive has been dispensed, the dispensing of the adhesive is stopped, even if the adhering mechanism has not reached the terminal edge of the stack top. This procedure may result in terminal sheet ends not being adhered to one another. The required amount of adhesive for the entire sheet is determined by the required adhesive thickness between the layers and the predefined dimensions of the unbonded sheet being adhered to the stack top. The adhesive layer has a minimum required thickness that will allow adequate bonding of the sheets so as not be influenced by small inconsistencies in the planarity of the stack top. Any additional thickness of the adhesive layer, beyond the essential minimum thickness, is intended to affect the flexibility of the model. The thicker the adhesive layer, the more flexible is the model.

A computerized control system (not shown) computes the needed volume of adhesive by multiplying the adhesive thickness by the sheet area. The required thickness of the adhesive layer is achieved by controlling the vertical distance between the sheet contact surface 44 of the application mechanism 14 and the stack. The larger the distance between the contact surface and the stack top, the thicker the adhesive layer. This distance may be varied as necessary, by adjusting the application mechanism 14 or the stack table (not shown) along the Z-axis (height as illustrated here). During the adhering process the control system activates a pump (not shown) so as to deposit the required amount of adhesive. Alternatively, a valve may be used so as to allow the adhesive to flow by the force of gravity.

Figure 5:
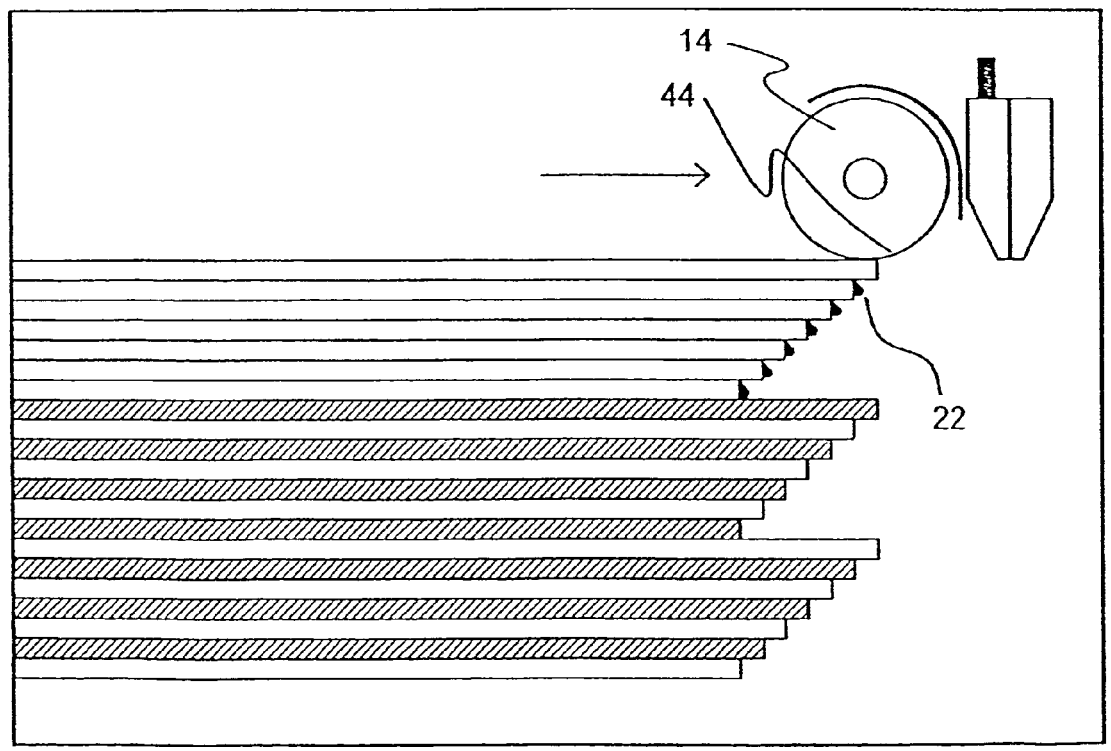
FIG. 5 is a side elevation schematic view of terminal sheet edges of a bonded together stack of sheets according to the teachings of the present invention.

In anticipation of spillage that may be caused by unforeseeable factors such as non-uniformity in layer the length (distance from leading edge to terminal edge) of successive unbonded sheets may be varied so as to form a stepped configuration, preferably at the terminal stack edge, such as the non-limiting example of FIG. 5. Here, the length is varied by making each successive unbonded sheet longer by, for example, a few millimeters. Alternatively, each successive unbonded sheet may be made shorter. This allows the excess adhesive to spill over the terminal sheet edge 22 of the previous sheet, without wetting the sheet contact surface 44 of the application mechanism 14 or swelling the stack. When a predetermined number of sheets have been stacked, the next unbonded sheet is then shortened by the amount calculated by multiplying the predetermined number of sheets by the length added to each. The cycle of adding length to each sheet is then repeated. Optionally, the overhanging portion of the stack may be cut off between cycles.

It should be noted, as will be obvious to one skilled in the art that there are numerous alternative embodiments possible within the scope of the present invention.

Figure 6:
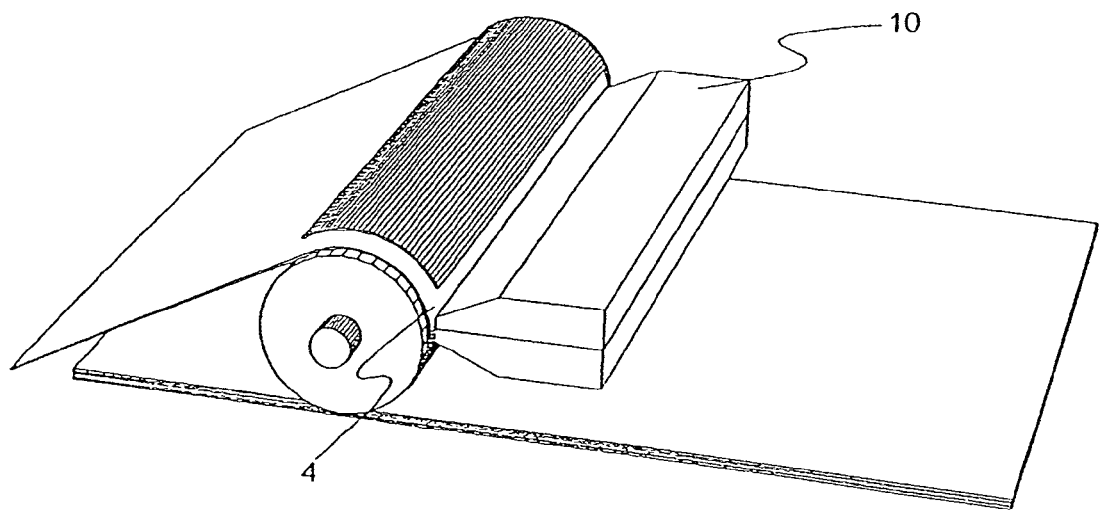
FIG. 6 is a schematic perspective view of an alternative preferred deployment of an adhesive dispenser according to the teachings of the present invention, so as to deposit adhesive on the underside of the unbonded sheet.

With regard to the adhesive dispenser, the adhesive may be dispensed continuously from the adhesive dispenser 10; it may be dispensed at predetermined intervals along the path of the adhesive dispenser as it moves across the stack top, or the entire required amount of adhesive may be deposited at one time, at the beginning of the adhering process. Alternatively, as shown in FIG. 6, the adhesive dispenser 10 may deposit the adhesive on the underside of the unbonded sheet 4.

Figure 7:
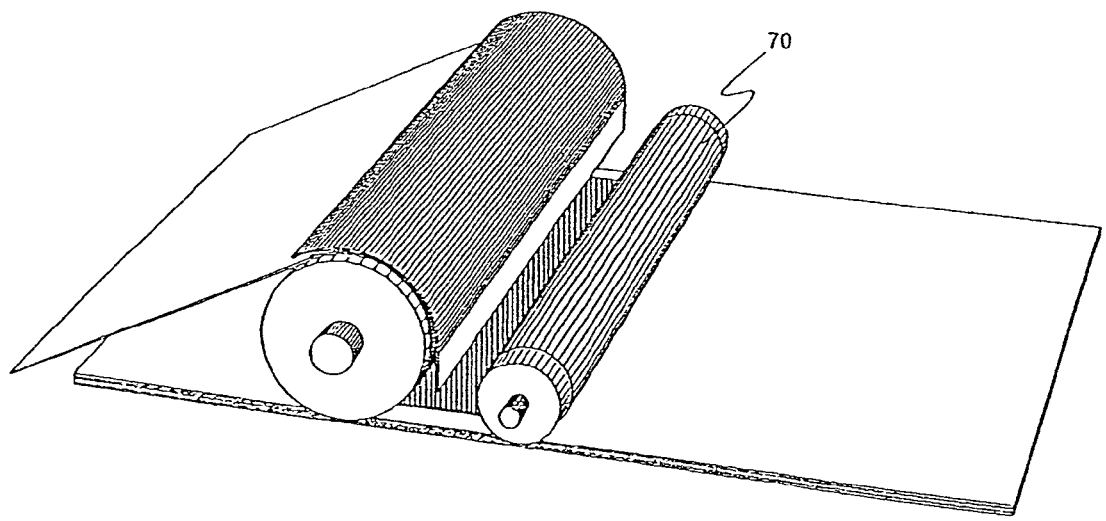
FIGS. 7-9 are schematic perspective views of alternative preferred embodiments of an adhesive dispenser according to the teachings of the present invention, wherein the adhesive dispensers are rollers that contact the surface to which the adhesive is being applied.

In another alternative, as shown in FIG. 7, the adhesive dispenser may be implemented as a wet roller 70. The wet roller 70 may be hollow, in which case the adhesive may be contained inside the roller, or supplied to the roller from a remote container using a tube (not shown). In case of a hollow roller 70, the adhesive is supplied to its surface through holes in the cylindrical surface. Alternatively, the roller 70 may not be hollow, but may be in physical contact in its outer surface with a wetting mechanism (not shown) that keeps the surface of the roller wet with adhesive.

Figure 8:
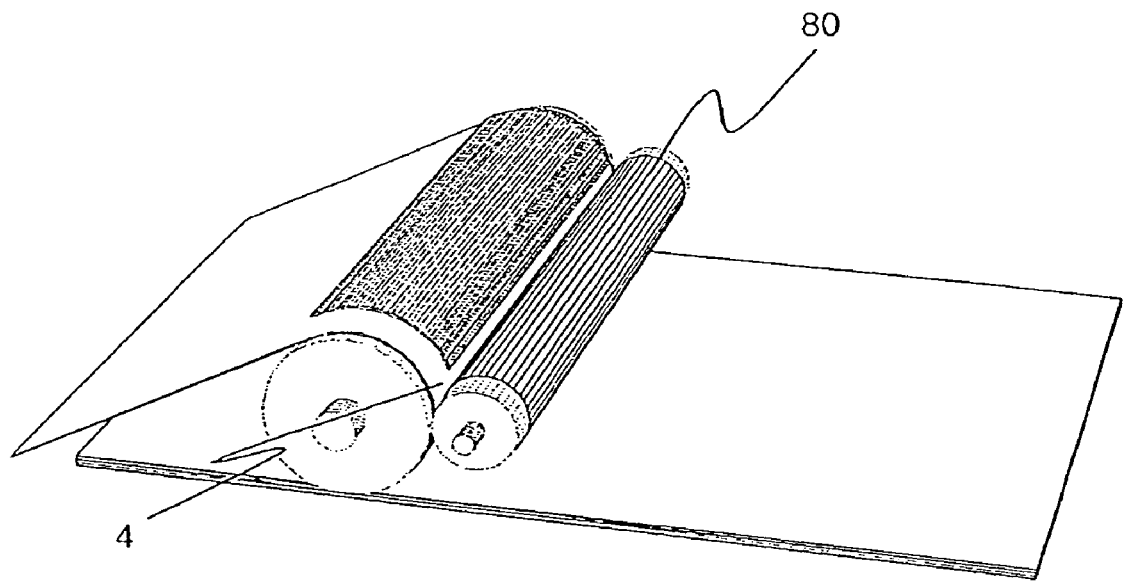

In the third alternative embodiment of an adhesive dispenser, shown in FIG. 8, the wet roller 80 deposits adhesive on the underside of the unbonded sheet 4.

Figure 9:
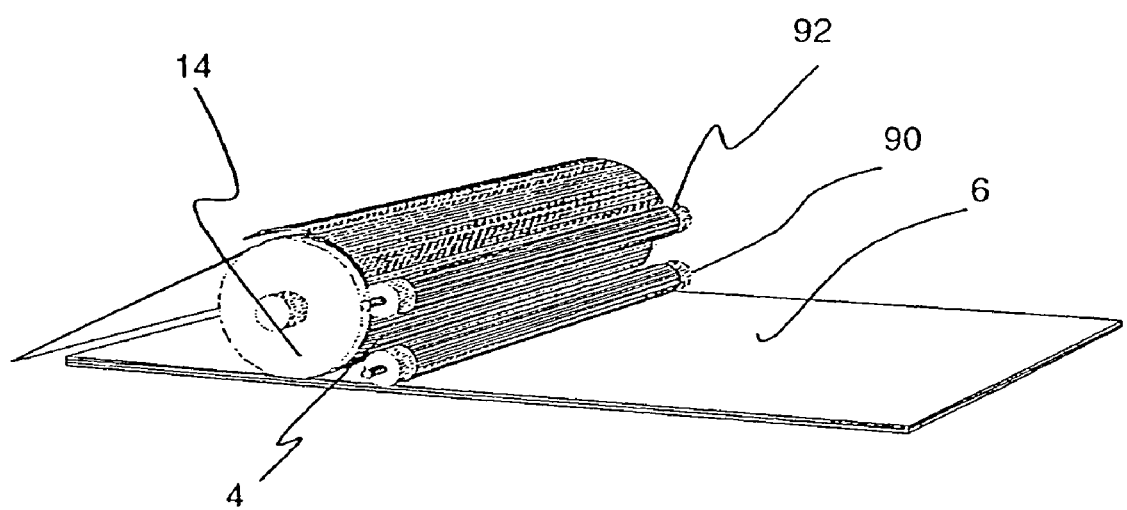

The fourth alternative adhesive dispenser embodiment of FIG. 9 provides two wet rollers 90 and 92, each respectively depositing adhesive on the stack top and the underside of the unbonded sheet simultaneously. The depositing of adhesive on both the underside of the unbonded sheet and the stack top may also be accomplished by the use of a single roller.

In each of the wet roller alternative embodiments, wet roller or rollers apply the adhesive to the respective surface by coming into physical contact with the surface when rolling over it, or by maintaining a small gap between the roller and the surface, so that the adhesive is applied to the surface by means of molecular forces between the adhesive on the surface of the roller and the sheet surface onto which it is being deposited. It should be noted further, that any of the roller wetting elements may be implemented as, but not limited to, a hollow beam or hollow plate containing a sponge or other absorbing material.

In yet another alternative configuration, the adhesive applicator may first apply adhesive to the entire sheet. The adhesive applicator then moves back to its home position and subsequently the new sheet is fed and laid over the stack by the application mechanism. Here, the adhesive dispenser may be configured to move across the stack top on the same axis as the application mechanism, or on the axis perpendicular to the axis of the application mechanism.

It should be further noted that other adhesive applicators known in the art, such as, but not limited to, solenoid valves, actuators, inkjet sprays, piezoelectric devices, pressure sprays and others are also in the scope of the present invention.

Figure 10:
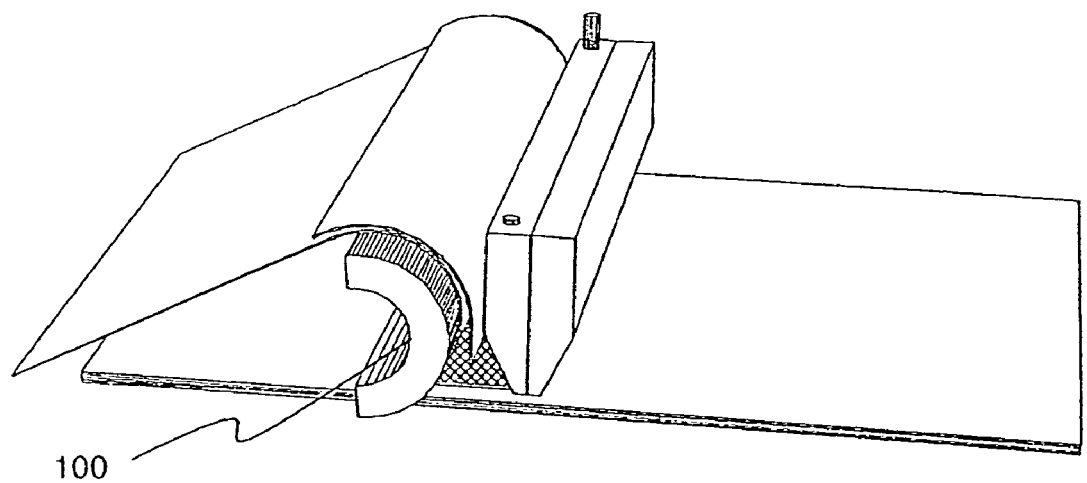
FIG. 10 is a schematic perspective view of a second preferred embodiment of a sheet bonding mechanism constructed and operative according to the teachings of the present invention, wherein the adhesive is deposited on the top of the bonded together sheets, and the application mechanism is a non-rotating convex element.

With regard to alternative embodiments of the application mechanism, FIG. 10 illustrates an application mechanism implemented as a convex beam 100. The convex shape acts similarly to the roller mentioned above so as to cause a "curl" to be formed in the unbonded sheet, in proximity to the stack top.

In FIG. 11, the application mechanism is implemented as a flat-plate 102 with an up-curved leading edge 104. Here, the up-curved leading edge causes a bend to be formed in the unbonded sheet, in proximity to the stack top. The leading edge of the flat plate need not be up-curved and may alternatively be formed as, but not limited to, a straight edge, or planar surface at angle to the sheet contact surface.

With the three implementations of application mechanism discussed above it is preferable that the unbonded sheet is curved as it is brought into contact with the stack top, in which case its own flexibility causes it to be pressed against the top of the stack. Additionally, the application mechanism may or may not apply pressure to the unbonded sheet and the stack top as required for a particular construction application.

In all the embodiments mentioned above, the molecular forces between the sheet and the adhesive, and between the adhesive molecules themselves, cause even spreading of the adhesive across the sheet even if not applied evenly.

Turning now to the feature of easy removal of the completed stack, the first layer of a stack of bonded together sheets should be firmly mounted on a planar surface, which serves as a rigid support base on which the object is constructed. When the objective of the stack process is to construct a three-dimensional object, this is particularly important in order to hold the stack in place when consecutive layers are bonded and cut. Failing to hold the stack in place will result in inaccuracy of the model and may hinder removal of residue material when the object is completed, due to shifts between the different contoured layers. This firm mounting of the stack on the rigid support base causes the stack of sheets, which are bonded to one another, to become rigid and detaching it from the rigid support base requires substantial force to be applied by hand.

To overcome this problem, the present invention does not attach the first layer sheet directly to the rigid support base 120, but rather to an intermediate flexible support structure 122. As shown in FIG. 12, the stack 124 is firmly bonded to the intermediate flexible support structure, which is in turn attached to the rigid support base in a manner that will hold it in place during the construction.

In one preferred embodiment, the flexible support structure 122 may be attached to the rigid support base by a plurality of connection posts 130, as seen in FIG. 13, extending from the rigid support base, with corresponding perforations 140, as seen in FIG. 14, in the flexible support structure. When the stacking process is completed, the stack of sheets including the flexible support structure is easily lifted from the rigid support base, and therefore the stacking apparatus. The flexible support structure 122 is then manually separated from the bottom of the stack, as seen in FIG. 14. Advantage is taken of the flexible nature of flexible support structure, which allows it to be bent as necessary during the separation process, thus requiring the application of less force than the separation of a rigid plate from the solid block. Alternatively, the flexible support structure may be attached to the rigid support base by strips of adhesive material. The flexible support structure may be made out of silicon rubber, natural rubber, plastic material like polypropylene or polyethylene, or any other flexible sheet material to which the stack can be attached without forming a strong bond. The flexible support structure may also be implemented as a sheet of magnetic material. In such a case, the rigid support base is made of steel or iron, to which the flexible support structure 122 is attached by magnetic forces.

It will be appreciated that the above descriptions are intended only to serve as examples, and that many other embodiments are possible within the spirit and the scope of the present invention.

What is claimed is:

1. A method of adhering sheets together without entrapping bubbles between the sheets, comprising:
    (a) providing a stationary stack of at least one sheet, said stationary stack including a stack top, a leading stack edge, and a terminal stack edge;
    (b) positioning at least a first flexible unbonded sheet proximal to said stationary stack, said unbonded sheet including a sheet top side, a sheet underside, a leading sheet edge and a terminal sheet edge;
    (c) dispensing adhesive on only a portion of one of said underside of said unbonded sheet and said stack top; and
    (d) deploying said unbonded sheet on said stack top, by use of an application mechanism, by:
        (i) bringing said underside of said unbonded sheet adjacent to said leading sheet edge into contact with said stack top adjacent to said leading stack edge thereby creating a bonded portion of said unbonded sheet, a remaining unbonded portion of said unbonded sheet is supported above said stack top thereby defining a line of contact between said unbonded sheet and said stack top;
        (ii) creating an accumulation of said adhesive in a region adjacent to said line of contact using an adhesive dispenser which deposits a larger amount of adhesive at the beginning of movement of said adhesive dispenser than during the remainder of said movement of said adhesive dispenser across said stack top; and
        (iii) moving said application mechanism and said adhesive dispenser across said stack top in a direction that is substantially parallel to said stack top, and substantially perpendicular to and away from said leading stack edge, said unbonded sheet being deployed between a sheet contact surface of said application mechanism and said stack top, while said adhesive dispenser deposits adhesive proximal to and in front of said line of contact between said unbonded sheet and said stack top, thereby advancing said line of contact in said direction of movement.

2. The method of claim 1, wherein said dispensing of said adhesive is accomplished by supporting said adhesive dispenser a distance away from a surface to which said adhesive is applied.

3. The method of claim 1, wherein said dispensing of said adhesive is accomplished by said adhesive dispenser contacting a surface to which said adhesive is applied.

4. The method of claim 1, wherein said moving of said adhesive dispenser and said moving of said application mechanism is concurrent in said direction of movement, said adhesive dispenser being deployed forward of said line of contact and said application mechanism being deployed rearward of said line of contact.

5. The method of claim 1, wherein said dispensing of said adhesive is substantially continuous.

6. The method of claim 1, wherein said dispensing of said adhesive is substantially at intervals.

7. The method of claim 1, wherein said moving of said application mechanism includes applying pressure to said unbonded sheet and said stack top.

8. The method of claim 1, further including bending said unbonded sheet such that said remaining portion of said unbonded sheet is at angle to said stack top at a degree sufficient enough that properties of resiliency inherent to said unhanded sheet create forces whereby said unbonded sheet is pressed against said stack top.

9. The method of claim 1, further including varying a vertical distance between said sheet contact surface and said stack top, said variance calculated according to a required amount of said adhesive.

10. The method of claim 1, wherein said deploying of said unbonded sheet on said stack top is accomplished by use of said application mechanism including said sheet contact surface implemented as a cylindrical surface of a roller.

11. The method of claim 1, wherein said deploying of said unbonded sheet on said stack top is accomplished by use of said application mechanism which includes said sheet contact surface implemented as a linear region of contact of a non-rotating bar.

12. The method of claim 1, wherein said deploying of said unbonded sheet on said stack top is accomplished by use of said application mechanism which includes said sheet contact surface implemented as a substantially planar surface of a non-rotating plate.

13. The method of claim 1, wherein said advancement of said line of contact continues to said terminal sheet edge.

14. The method of claim 1, further including varying lengths of subsequent ones of said unbonded sheet in said direction of movement such that subsequent said terminal sheet edges form a stepped configuration.

* * * * *

UNITED STATES PATENT AND TRADEMARK OFFICE
CERTIFICATE OF CORRECTION

PATENT NO. : 7,749,347 B2
APPLICATION NO. : 10/471320
DATED : July 6, 2010
INVENTOR(S) : Yosi Bar-Erez and Eyal Bar-Erez It is certified that error appears in the above-identified patent and that said Letters Patent is hereby corrected as shown below:

Front Page

Inventors (75) should be corrected as follows:

change

--Exal-- to

"Eyal"

Signed and Sealed this

Fifth Day of October, 2010

David J. Kappos
*Director of the United States Patent and Trademark Office*